United States Patent
Gupta et al.

(10) Patent No.: US 11,169,933 B2
(45) Date of Patent: Nov. 9, 2021

(54) INTEGRATION OF APPLICATION INDICATED MAXIMUM TIME TO CACHE FOR A TWO-TIERED CACHE MANAGEMENT MECHANISM

(71) Applicant: INTERNATIONAL BUSINESS MACHINES CORPORATION, Armonk, NY (US)

(72) Inventors: Lokesh Mohan Gupta, Tucson, AZ (US); Matthew G. Borlick, Tucson, AZ (US); Kyler A. Anderson, Sahuarita, AZ (US); Beth Ann Peterson, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 59 days.

(21) Appl. No.: 16/790,310

(22) Filed: Feb. 13, 2020

(65) Prior Publication Data

US 2021/0255965 A1    Aug. 19, 2021

(51) Int. Cl.
  *G06F 12/00*    (2006.01)
  *G06F 13/00*    (2006.01)
  *G06F 13/28*    (2006.01)
  *G06F 12/123*    (2016.01)
  *G06F 12/0811*    (2016.01)

(52) U.S. Cl.
  CPC ........ *G06F 12/124* (2013.01); *G06F 12/0811* (2013.01); *G06F 2212/1021* (2013.01); *G06F 2212/608* (2013.01)

(58) Field of Classification Search
  CPC ... G06F 12/123; G06F 12/124; G06F 12/0811
  USPC ........................................................ 711/136
  See application file for complete search history.

(56) References Cited

U.S. PATENT DOCUMENTS

| | | | |
|---|---|---|---|
| 5,513,336 A | 4/1996 | Vishlitzky et al. | |
| 8,423,715 B2 | 4/2013 | Heil et al. | |
| 8,533,393 B1 | 9/2013 | Cote et al. | |
| 9,390,116 B1 | 7/2016 | Li et al. | |
| 9,529,731 B1 | 12/2016 | Wallace et al. | |
| 9,946,657 B1 | 4/2018 | Muthukkaruppan et al. | |
| 10,067,883 B2 | 9/2018 | Ash et al. | |

(Continued)

OTHER PUBLICATIONS

IEEE Search Results (Year: 2021).*

(Continued)

*Primary Examiner* — Edward J Dudek, Jr.
*Assistant Examiner* — Sidney Li
(74) *Attorney, Agent, or Firm* — Konrad Raynes Davda & Victor LLP; Rabindranath Dutta

(57) ABSTRACT

An indication of a maximum retention time in a cache comprising a first type of memory and a second type of memory for a first plurality of tracks is received from a host application, wherein no maximum retention time is indicated for a second plurality of tracks. In response to demoting a track of the first plurality of tracks from the first type of memory to the second type of memory, an adjustment of a first amount of time that the track is allowed to be retained in the second type of memory is based on a second amount of time the track has already been present in the first type of memory prior to being demoted from the first type of memory to the second type of memory.

20 Claims, 12 Drawing Sheets

(56) References Cited

U.S. PATENT DOCUMENTS

| | | | |
|---|---|---|---|
| 10,270,879 | B1 | 4/2019 | Wallner et al. |
| 2008/0046655 | A1 | 2/2008 | Bhanoo et al. |
| 2009/0037660 | A1 | 2/2009 | Fairhurst |
| 2014/0067852 | A1 | 3/2014 | Wong et al. |
| 2014/0330817 | A1 | 11/2014 | Eleftheriou et al. |
| 2015/0039837 | A1 | 2/2015 | Quan et al. |
| 2016/0378601 | A1* | 12/2016 | Oukid .................... G06F 11/00 714/3 |
| 2017/0052898 | A1 | 2/2017 | Ash et al. |
| 2018/0067660 | A1 | 3/2018 | Yamamoto |
| 2018/0300257 | A1 | 10/2018 | Ash et al. |
| 2019/0391923 | A1 | 12/2019 | Gupta et al. |
| 2019/0391930 | A1* | 12/2019 | Gupta .................... G06F 12/123 |
| 2019/0391931 | A1 | 12/2019 | Gupta et al. |
| 2019/0391932 | A1 | 12/2019 | Gupta et al. |
| 2019/0391933 | A1 | 12/2019 | Gupta et al. |

OTHER PUBLICATIONS

U.S. Appl. No. 16/790,226, filed Feb. 13, 2020.
U.S. Appl. No. 16/790,249, filed Feb. 13, 2020.
List of IBM Patents and Applications Treated and Related, dated Feb. 13, 2020., pp. 2.
M. Gaur, et al. "Bypass and Insertion Algorithms for Exclusive Last-Level Caches", Jun. 2011, ACM, ISCA 2011, pp. 81-92.
J. Hsieh, et al., "Double Circular Caching Scheme for DRAM/PRAM Hybrid Cache", Aug. 2012, IEEE, 2012 IEEE International Conference on Embedded and real-Time Computing Systems and Applications, pp. 469-472.
Office Action dated May 28, 2021, pp. 18, for U.S. Appl. No. 16/790,249.
Notice of Allowance dated May 10, 2021, pp. 14, for U.S. Appl. No. 16/790,226.
D.Ustiugov, et al., "Design Guidelines for High Performance SCM Hierarchies", International Symposium on Memory Systems (MEMSYS) Oct. 2018, pp. 16.
Response dated Aug. 30, 2021 pp. 10, to Office Action dated May 28, 2021, pp. 18, for U.S. Appl. No. 16/790,249.

* cited by examiner

INTEGRATION OF APPLICATION INDICATED MAXIMUM TIME TO CACHE FOR A TWO-TIERED CACHE MANAGEMENT MECHANISM

BACKGROUND

1. Field

Embodiments relate to the integration of application indicated maximum time to cache for a two-tiered cache management mechanism.

2. Background

In certain storage system environments, a storage controller (or a storage controller complex) may comprise a plurality of storage servers that are coupled to each other. The storage controller allows host computing systems to perform input/output (I/O) operations with storage devices controlled by the storage controller, where the host computing systems may be referred to as hosts.

The storage controller may include two or more servers, where each server may be referred to as a node, a storage server, a processor complex, a Central Processor Complex (CPC), or a Central Electronics Complex (CEC). Each server may have a plurality of processor cores and the servers may share the workload of the storage controller. In a two server configuration of the storage controller that is also referred to as a dual-server based storage controller, in the event of a failure of one of the two servers, the other server that has not failed may take over the operations performed by the failed server.

Data written from a host may be stored in the cache of the storage controller, and at an opportune time the data stored in the cache may be destaged (i.e., moved or copied) to a storage device. Data may also be staged (i.e., moved or copied) from a storage device to the cache of the storage controller. The storage controller may respond to a read I/O request from the host from the cache, if the data for the read I/O request is available in the cache, otherwise the data may be staged from a storage device to the cache for responding to the read I/O request. A write I/O request from the host causes the data corresponding to the write to be written to the cache, and then at an opportune time the written data may be destaged from the cache to a storage device. Since the storage capacity of the cache is relatively small in comparison to the storage capacity of the storage devices, data may be periodically destaged from the cache to create empty storage space in the cache. Data may be written and read from the cache much faster in comparison to reading and writing data from a storage device. In computing, cache replacement policies are used to determine which items to discard (i.e., demote) from the cache to make room for new items in the cache. In a least recently used (LRU) cache replacement policy, the least recently used items are discarded first.

A storage class memory (SCM) is non-volatile memory that provides access speeds much higher than solid state drives (SSD). SCM is much cheaper than DRAM, but has a latency of a few microseconds which is higher than the latency of DRAM, where the latency of DRAM is of the order of nanoseconds. However, the latency of SCM is much lower than the latency of SSDs, where the latency of SSDs is generally greater than 100 microseconds. SCM may be comprised of non-volatile memory NAND devices that may be referred to as Flash memory. SCM may be comprised of other types of devices besides NAND devices.

In situations where SCM uses Flash memory for non-volatile storage, SCM exhibits some of the same limitations as SSDs. Flash memory devices have less endurance than DRAM as there are a limited number of erase cycles for flash bit cells, far less so than for DRAM cells. Wear leveling techniques that distribute writes across multiple flash memory cells in the same or different devices may be used to avoid overuse of specific Flash memory cells. Additionally, garbage collection may be time consuming with Flash memory based devices. There are many pages in an erase block. Since writes to Flash memory is done in pages but reclaiming is done on erase blocks level, it may to fragmentation and hence garbage collection may become processor intensive over time for SCM. It should be noted that generally SCMs have less write endurance and slower access characteristics than DRAM, but while many SCMs use Flash memory, not all do.

SUMMARY OF THE PREFERRED EMBODIMENTS

Provided are a method, system, and computer program product in which an indication of a maximum retention time in a cache comprising a first type of memory and a second type of memory for a first plurality of tracks is received from a host application, wherein no maximum retention time is indicated for a second plurality of tracks. In response to demoting a track of the first plurality of tracks from the first type of memory to the second type of memory, an adjustment of a first amount of time that the track is allowed to be retained in the second type of memory is based on a second amount of time the track has already been present in the first type of memory prior to being demoted from the first type of memory to the second type of memory.

In further embodiments, the first type of memory is a dynamic random access memory (DRAM) cache and the second type of memory is a storage class memory (SCM) cache, wherein the first amount of time that the track is allowed to be retained in the SCM cache is determined by computing a difference between the maximum retention time indicated for the first plurality of tracks and the second amount of time the track has already been present in the DRAM cache prior to being demoted from the DRAM cache to the SCM cache.

In yet further embodiments, an insertion point of the track in a least recently used (LRU) list of the SCM cache for the track is determined based on the amount of time that the track is allowed to be retained in the SCM cache.

In certain embodiments, different insertion points in the LRU list of the SCM cache correspond to different amounts of time that a selected track of the first plurality of tracks is expected to be retained in the SCM cache, wherein the LRU lists with insertion points are configured to demote both tracks of the first plurality of tracks and the second plurality of tracks, and wherein different LRU lists are maintained or the DRAM cache and the SCM cache.

In further embodiments, in response to adding the track to the insertion point, insertion points in the LRU list of the SCM cache are moved by one track to accommodate the adding of the track.

In additional embodiments, the DRAM cache has a lower latency and a lower storage capacity than the SCM cache, wherein the DRAM cache and the SCM cache form a two-tier cache with the DRAM cache being a higher tier and the SCM cache being a lower tier, and wherein tracks are promoted to the SCM cache from the DRAM cache in response to determining that a read access time exceeds a first predetermined threshold and a write access time is below a second predetermined threshold.

In yet additional embodiments, tracks of the second plurality of tracks undergo a default mechanism for demotion from the two-tier cache.

BRIEF DESCRIPTION OF TIE DRAWINGS

Referring now to the drawings in which like reference numbers represent corresponding parts throughout:

DETAILED DESCRIPTION

Figure 1:
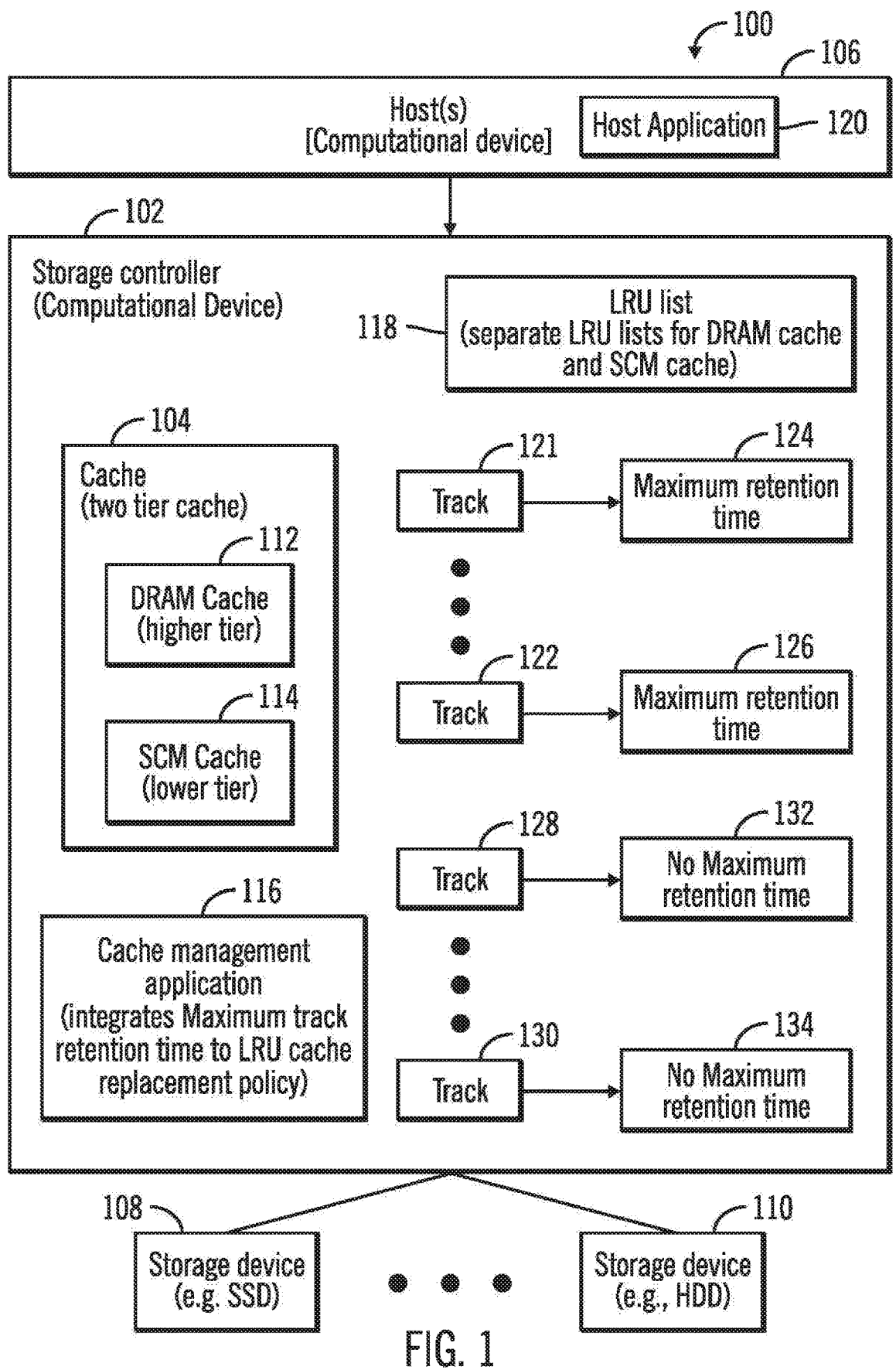
FIG. 1 illustrates a block diagram of a computing environment comprising a storage controller with a two-tier cache coupled to one or more hosts and one or more storage devices, in accordance with certain embodiments.

In the following description, reference is made to the accompanying drawings which form a part hereof and which illustrate several embodiments. It is understood that other embodiments may be utilized and structural and operational changes may be made.

A storage controller may include a two-tiered cache in which a first tier of the cache is a Dynamic Random Access Memory (DRAM) cache and a second tier of the cache is a storage class memory (SCM) cache. The storage capacity of the DRAM cache is a relatively smaller in comparison to the storage capacity of the SCM cache. However, the latency of the DRAM cache is relatively lower than the latency of the SCM cache. There is a need in the art for improved techniques for managing a two-tiered cache that includes DRAM and SCM.

Ina conventional least recently used (LRU) based cache management mechanism of a storage controller, a cache management application may add a track to the most recently used (MRU) end of a least recently used (LRU) list of tracks. The cache management application demotes a track from the cache, in response to determining that the track is a least recently used (LRU) track in a LRU list of tracks.

Certain applications may provide indications (i.e., hints) to the cache management application of the maximum amount of time that a track should remain in the cache, where the application is aware that the track is unlikely to access the track after the indicated maximum amount of time. The maximum amount of time is referred to as the maximum retention time. As a result, caching operations in a storage controller takes account of hints provided by an application to retain certain tracks in cache for no more than a maximum amount of time before demoting the tracks. If the maximum retention time is not specified by the application then the conventional (i.e., default) LRU based cache management mechanism is employed.

In a two-tiered cache, different applications may specify different maximum retention times and certain embodiments attempt to satisfy the different maximum times indicated by the different applications, while at the same time satisfying the requirements of other applications that do not specify maximum retention times by employing conventional LRU based cache management mechanism for such other applications.

In certain embodiments, an application specifies the maximum retention time for a track in the combined cache, where the combined cache is comprised of the DRAM cache and the SCM cache. In certain embodiments, multiple insertion points are maintained in LRU lists of both the DRAM cache and the SCM cache, where each insertion point represents an interval of time when tracks below that insertion point are to be demoted. If a track whose maximum retention time has been indicated is accessed then the track is added to the closest insertion point which represents the interval of time matching the maximum retention time. If the maximum retention time exceeds the residency time of the track in the DRAM cache then track is added to the MRU end of the DRAM cache. When a track is demoted from the DRAM cache and promoted to the SCM cache, the maximum retention time in the SCM cache is determined by subtracting the time spent in the DRAM cache from the original maximum retention time specified (i.e., maximum retention time in SCM cache=Original maximum retention time−Time track spent in DRAM cache). The new maximum retention time is used to determine the correct insertion point in the SCM cache.

Certain embodiments provide improvements to computer technology, by integrating application indicated maximum retention time for tracks to LRU based track demoting schemes in a cache management system of a storage controller. As a result, caching operations in a storage controller takes account of hints (i.e., indications) provided by an application to not retain certain tracks in cache beyond a maximum amount of time. A LRU list augmented such that a plurality of insertions points are generated in the LRU list, wherein different insertion points in the LRU list correspond to different amounts of time that a track is expected to be retained in the cache. While inserting tracks that have a maximum retention time, the insertion points are adjusted in the LRU list to accommodate the inserted track. While removing tracks, the insertion points are adjusted in the LRU list after the removal of the tracks. The retention time in the SCM cache may be adjusted based on time already spent in the DRAM cache by a track.

EXEMPLARY EMBODIMENTS

FIG. 1 illustrates a block diagram of a computing environment 100 comprising a storage controller 102 with a two-tier cache 104 coupled to one or more hosts 106 and one or more storage devices 108, 110, in accordance with certain embodiments.

The storage controller 102 allows the one or more hosts 106 to perform input/output (I/O) operations with logical storage maintained by the storage controller 102. The physical storage corresponding to the logical storage may be found in one or more of the storage devices 108, 110 and/or cache 104 (also referred to as a two-tier cache) of the storage controller 102.

The storage controller 102 and the hosts 106 may comprise any suitable computational device including those presently known in the art, such as, a personal computer, a workstation, a server, a mainframe, a hand held computer, a palm top computer, a telephony device, a network appliance, a blade computer, a processing device, a controller, etc. In certain embodiments, the storage controller 102 may be comprised of a plurality of servers. The plurality of servers may provide redundancy because if one server undergoes a failure from which recovery is not possible, an alternate server may perform the functions of the server that failed. Each of the plurality of servers may be referred to as a processing complex and may include one or more processors and/or processor cores.

The storage controller 102 and the one or more hosts 106 may be elements in any suitable network, such as, a storage area network, a wide area network, the Internet, an intranet. In certain embodiments, storage controller 102 and the one or more hosts 106 may be elements in a cloud computing environment.

The two-tier cache 104 may be any suitable cache known in the art or developed in the future. In some embodiments, the two-tier cache 104 may be implemented with a volatile memory (such as the DRAM cache 112) and a non-volatile memory (such as the SCM cache 114). The two-tier cache 104 may store both modified and unmodified data, where a cache management application 116 may periodically demote (i.e., move) data from the SCM cache 114 to storage devices 108, 110 controlled by the storage controller 102. In certain embodiments, cache management application 116 may be implemented in software, firmware, hardware or any combination thereof.

The plurality of storage devices 108, 110 may be comprised of any storage devices known in the art. For example, the storage device 108 may be a solid state drive (SSD) and the storage device 110 may be a hard disk drive (DD).

The DRAM cache 112 forms the higher tier of the two-tier cache 104, and the SCM cache 114 forms the lower tier of the two-tier cache. The DRAM cache 112 has a lower latency and a lower storage capacity than the SCM cache 114.

A LRU list 118 for each type of cache (e.g., one LRU list for the DRAM cache 112, and another LRU list for the SCM cache 114) is maintained in the storage controller 102 by the cache management application 115. The cache management application 116 receives indications from one or more host applications on whether tracks used by the host application 120 should be maintained in the two-tier cache 104 for no more than a maximum time duration. The maximum time duration for which a track may be maintained in the two-tier cache 104 is referred to as a maximum retention time. For example, the host application 120 may indicate that the maximum retention time in the two-tier cache 104 for a track is 10 seconds.

The maximum retention time may be provided in many different ways. A plurality of tracks 121, 122 may have maximum retention times 124, 126 indicated by host applications. Another plurality of tracks 128, 130 may have no indications of maximum retention time (as shown via reference numerals 132, 134). The LRU list 118 may include some of the plurality of tracks 121, 122 and some of the plurality of tracks 128, 130, i.e., the LRU list 118 includes tracks in the two-tier cache 104 with maximum retention time and tracks in the two-tier cache 104 without maximum retention time. It should be noted that each track stored in any tier of cache is indicated in the corresponding LRU list 118, and the LRU list 118 is used by the cache management application 116 to determine which tracks to demote from the tiers of the two-tier cache 104. Thus there is an LRU list for the DRAM cache 112 and another LRU list for the SCM cache 114.

In certain embodiments, the cache management application 116 demotes tracks from the two-tier cache 104 by taking into account the LRU list 118 which is augmented with the maximum retention time for tracks where such maximum retention times are available and insertion points for tracks in the LRU list 118.

Figure 2:
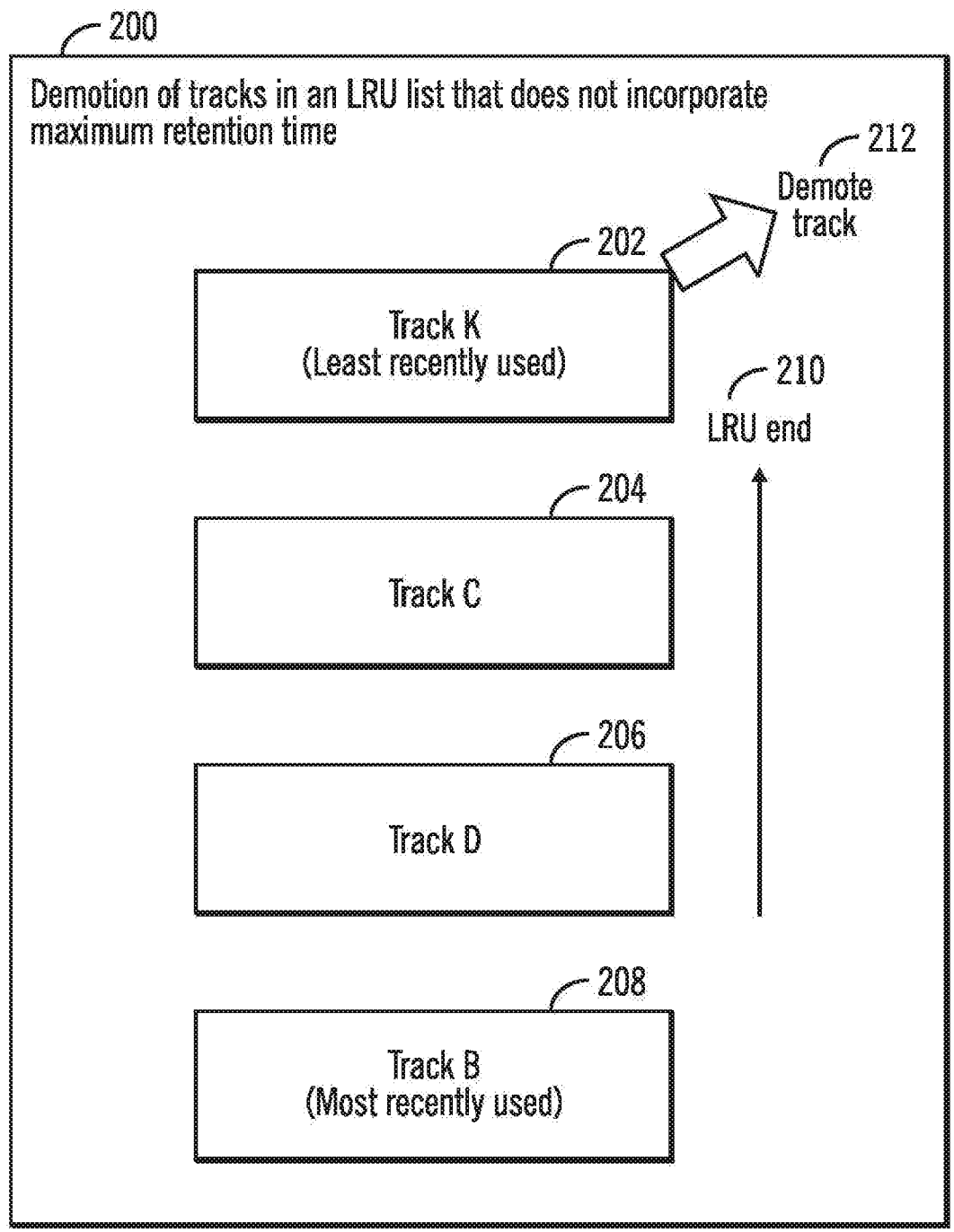
FIG. 2 illustrates a block diagram that shows demotion of tracks from an LRU list that does not incorporate a maximum retention time for selected tracks, in accordance with certain embodiments.

FIG. 2 illustrates a block diagram 200 that shows demotion of tracks from a LRU list that does not incorporate a maximum retention time for selected tracks, in accordance with certain embodiments. The LRU list may comprise either an LRU list for the DRAM cache 112 or an LRU list for the SCM cache 114 as shown in FIG. 1, reference numeral 118.

For simplicity, only four tracks, denoted as track K 202, track C 204, track D 206, and track B 208 are shown in FIG. 2, although a typical LRU list may have thousands or tens of thousands of tracks.

The LRU end of the list is towards the top (as shown via reference numeral 210). As a result, track K 202 is the least recently used track, and track B 208 is the most recently used track. Track K 202 which is the least recently used track is demoted first in a conventional (i.e., default) LRU based cache replacement policy (as shown via reference numeral 212).

Figure 3:
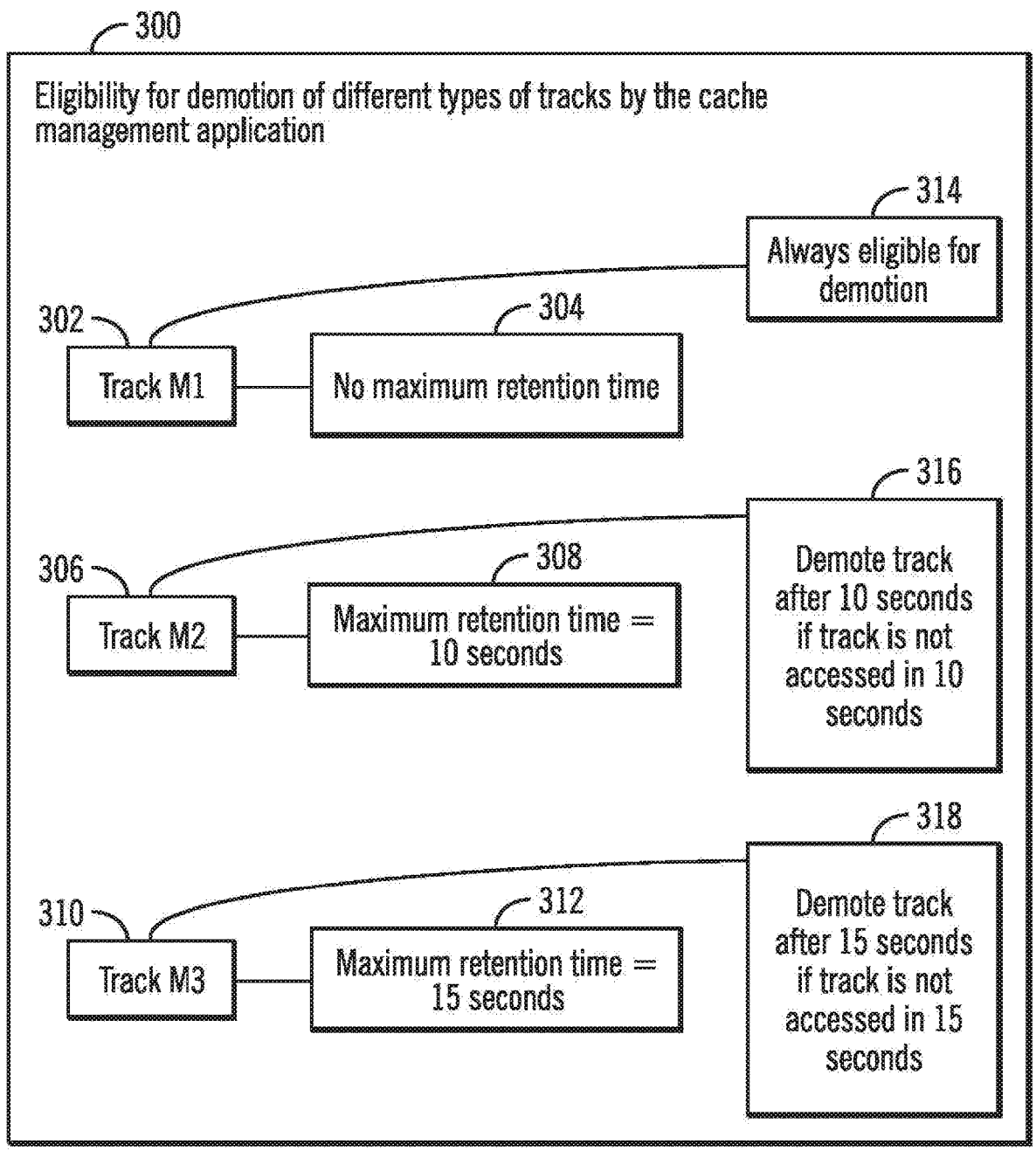
FIG. 3 illustrates a block diagram that shows the eligibility for demotion of different types of tracks, in accordance with certain embodiments.

FIG. 3 illustrates a block diagram 300 that shows the eligibility for demotion of different types of tracks in a cache 104, in accordance with certain embodiments.

Track M1 302 has no maximum retention time 304 indicated by the host application 120. As a result, track M1 302 is always eligible for demotion when track M1 302 reaches the LRU end of the LRU list 118 (as shown via reference numeral 314).

Track M2 306 has a maximum retention time 309 of 10 seconds indicated by the host application 120. As a result, track M2 306 should be demoted if track M2 306 is in cache beyond 10 seconds without being accessed (as shown via reference numeral 316).

Track M3 310 has a maximum retention time 312 of 15 seconds indicated by the host application 120. As a result, track M3 310 should be demoted if track M3 310 is in cache beyond 15 seconds without being accessed (as shown via reference numeral 318).

Figure 4:
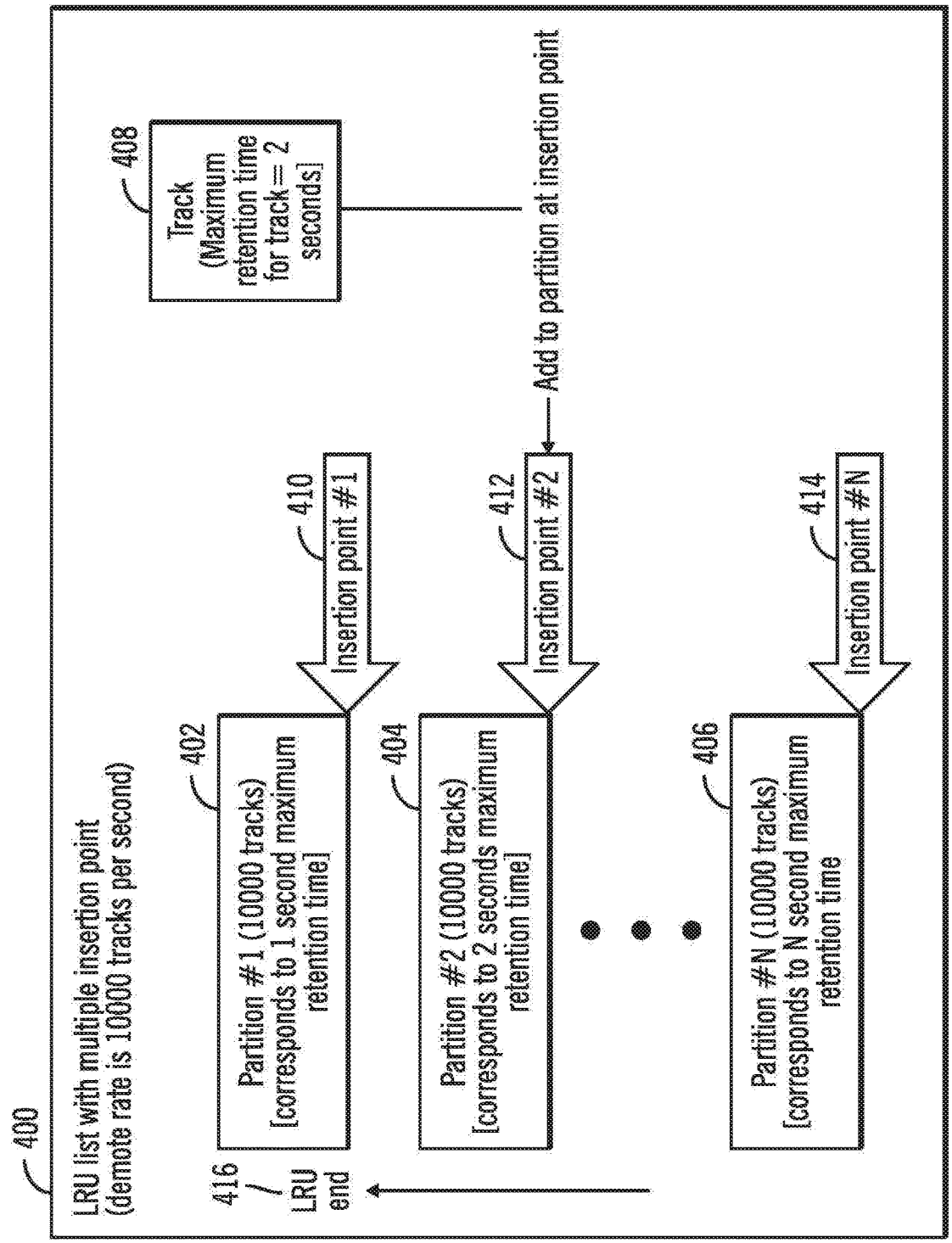
FIG. 4 illustrates a block diagram that shows a LRU list with multiple insertion points, in accordance with certain embodiments.

FIG. 4 illustrates a block diagram 400 that shows a LRU list (e.g., a LRU list for the DRAM cache 112 or a LRU list for the SCM cache 114 as indicated via the LRU list 118) with multiple insertion points, in accordance with certain embodiments.

In certain embodiments, an exemplary demote rate is 10000 tracks per second, i.e., 10000 tracks are on an average demoted from the cache every second. In such embodiments, the tracks on the LRU list are partitioned into a plurality of partitions 402, 404.406 where each partition includes 10000 tracks and insertion points 410, 412, 414 for new tracks to be added are at the end of each partition.

In FIG. 4, partition #1 402 corresponds to a maximum retention time of 1 seconds, partition #2 404 corresponds to a maximum retention time of 2 seconds, and partition #N 406 corresponds to ta maximum retention time of N seconds. The lowest retention time is towards the LRU end of the LRU list as shown via reference numeral 416.

If a track with a maximum retention time of 2 seconds needs to be inserted into the LRU list then the track is added to the insertion point #2 412 (as shown via reference numerals 408, 410).

Therefore, FIG. 4 shows how a LRU list has multiple insertion points corresponding to different amounts of time a track has been retained in a cache since the last access of the track, and how a track with a maximum retention time is inserted into the LRU list. It should be noted that when a track is inserted then some of the insertion points may need to be adjusted. For example, on inserting track 408, the insertion point #2 412 moves one track vertically downwards in FIG. 4, as partition #2 404 would have 10001 tracks after insertion of track 408.

Figure 5:
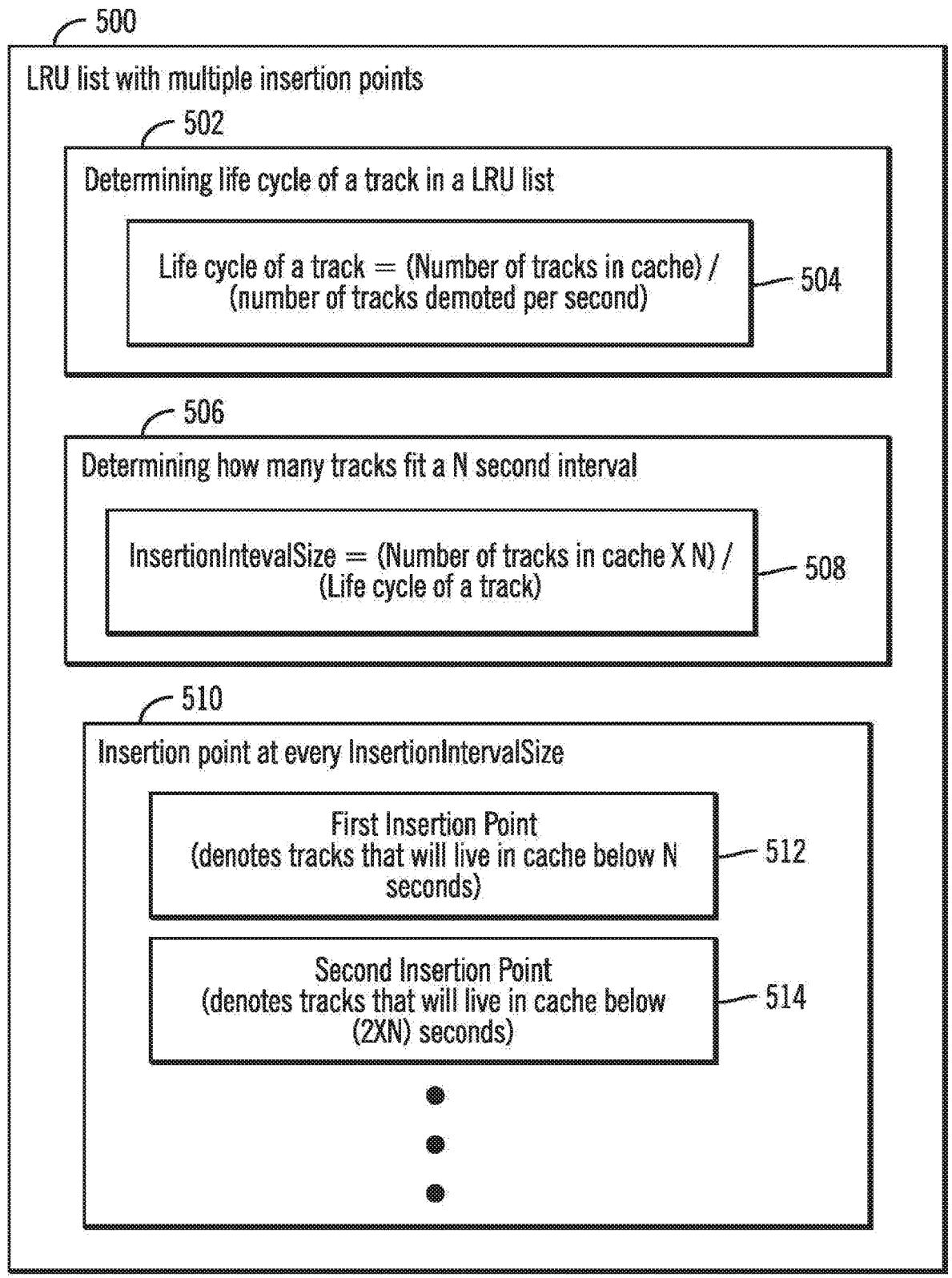
FIG. 5 illustrates a block diagram that shows how a LRU list with multiple insertion points is generated, in accordance with certain embodiments.

FIG. 5 illustrates a block diagram 500 that shows how a LRU list (e.g., a LRU list for the DRAM cache 112 or a LRU list for the SCM cache 114 as indicated via the LRU list 118) with multiple insertion points is generated, in accordance with certain embodiments.

The cache management application 116 determines the life cycle of a track in a LRU list (as shown via reference numerals 502, 504). This may be performed via different mechanisms. One mechanism is to determine the demote rate and then use the demote rate and cache size to find out the approximate life cycle of a track via the following calculation: Life cycle of a track=(Number of tracks in cache)/(number of tracks demoted per second).

Then the cache management application 116 determines how many tracks fit in a N second interval (referred to as InsertionIntervalSize) as follows: InsertionIntervalSize (Number of tracks in cache×N)/(Life cycle of a track) [as shown via reference numerals 506, 508].

There is an insertion point at every InsertionIntervalSize (as shown via reference numeral 512). The first insertion point 512 denotes tracks that will be retained in cache below N seconds. Second insertion point 514 denotes tracks that will be retained in cache below 2×N seconds, and so on.

Figure 6:
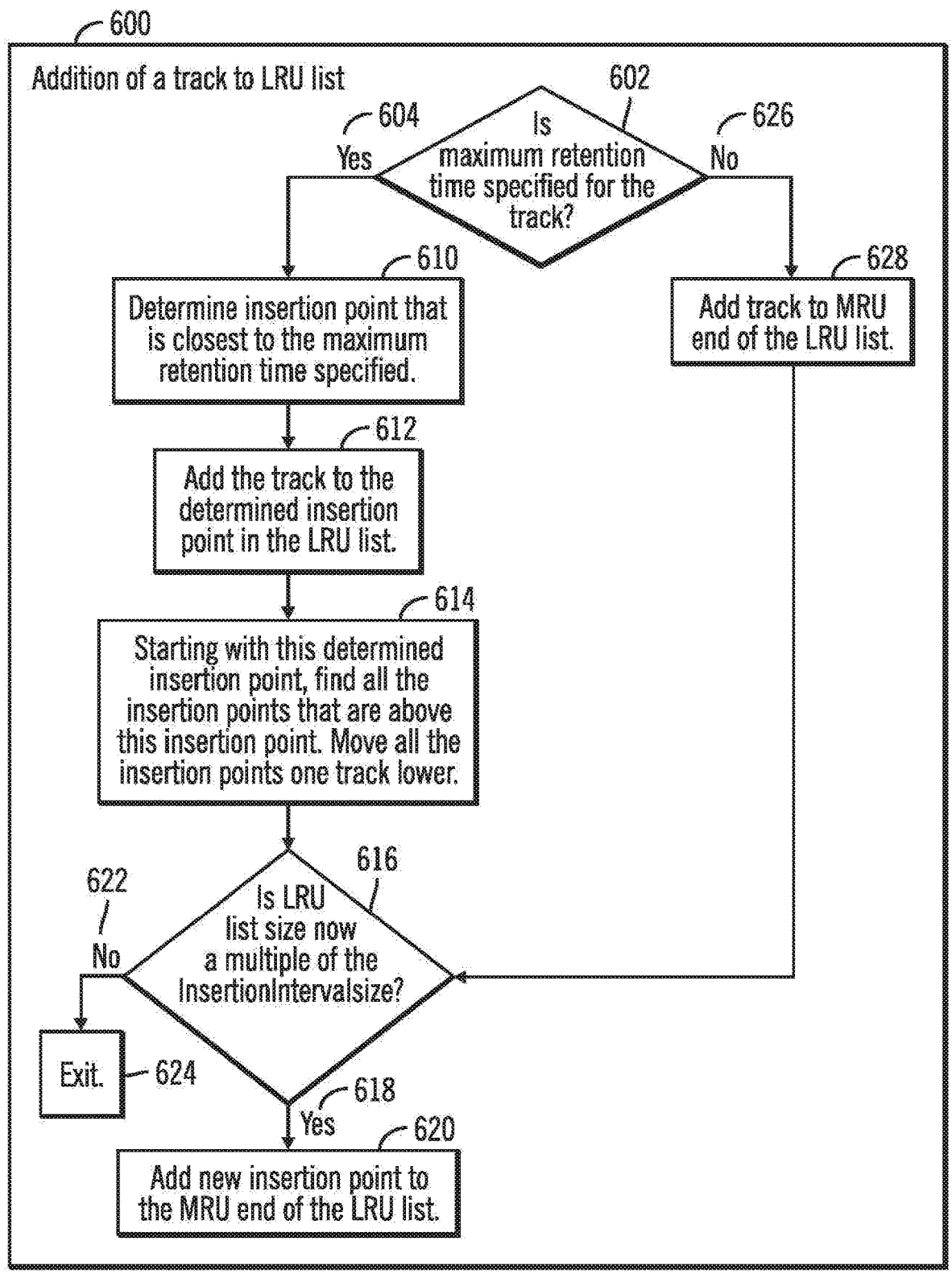
FIG. 6 illustrates a flowchart that shows the addition of a track to a LRU list, in accordance with certain embodiments.

FIG. 6 illustrates a flowchart 600 that shows the addition of a track to a LRU list (e.g., a LRU list for the DRAM cache 112 or a LRU list for the SCM cache 114 as indicated via the LRU list 118), in accordance with certain embodiments. The operations shown in FIG. 6 may be performed by the cache management application 116 that executes in the storage controller 102.

Control starts at block 602 in which the cache management application 116 determines whether a maximum retention time is specified for a track that is to be added to the LRU list 118. If so ("Yes" branch 604) control proceeds to block 610 in which the cache management application 116 determines the insertion point that is closest to the maximum retention time specified. The cache management application 116 adds (at block 612) the track to the determined insertion point in the LRU list 118.

From block 612 control proceeds to block 614 in which the cache management application 116 starts with the determined insertion point and finds all the insertion points that are above (i.e., have time durations for insertion that are more) the insertion point. The cache management application 116 moves all the insertion points one track lower (where lower corresponds to movement of the insertion point towards tracks that are expected to be longer in the cache).

The cache management application 116 then determines (at block 616) whether the RU list size is a multiple of the InsertionIntervalSize. If so ("Yes" branch 618) control proceeds to block 620 where a new insertion point is added to the MRU end of the LRU list 118 (For example, if InsertionIntervalSize is 10000 and the size of the LRU list becomes 20000, then a new insertion point may be added at the MRU end). If not ("No" branch 622), the process exits (at block 624).

If at block 602 the cache management application 116 determines that the track does not have a maximum retention time ("No" branch 626) then control proceeds to block where the track is added to the MRU end of the LRU list 118. For example, InsertionIntervalSize is 10000 and the size of the LRU list becomes 20000, then a new insertion point is added at the MRU end.

Therefore, FIG. 6 illustrates certain embodiments for adding tracks to the LRU list 118.

Figure 7:
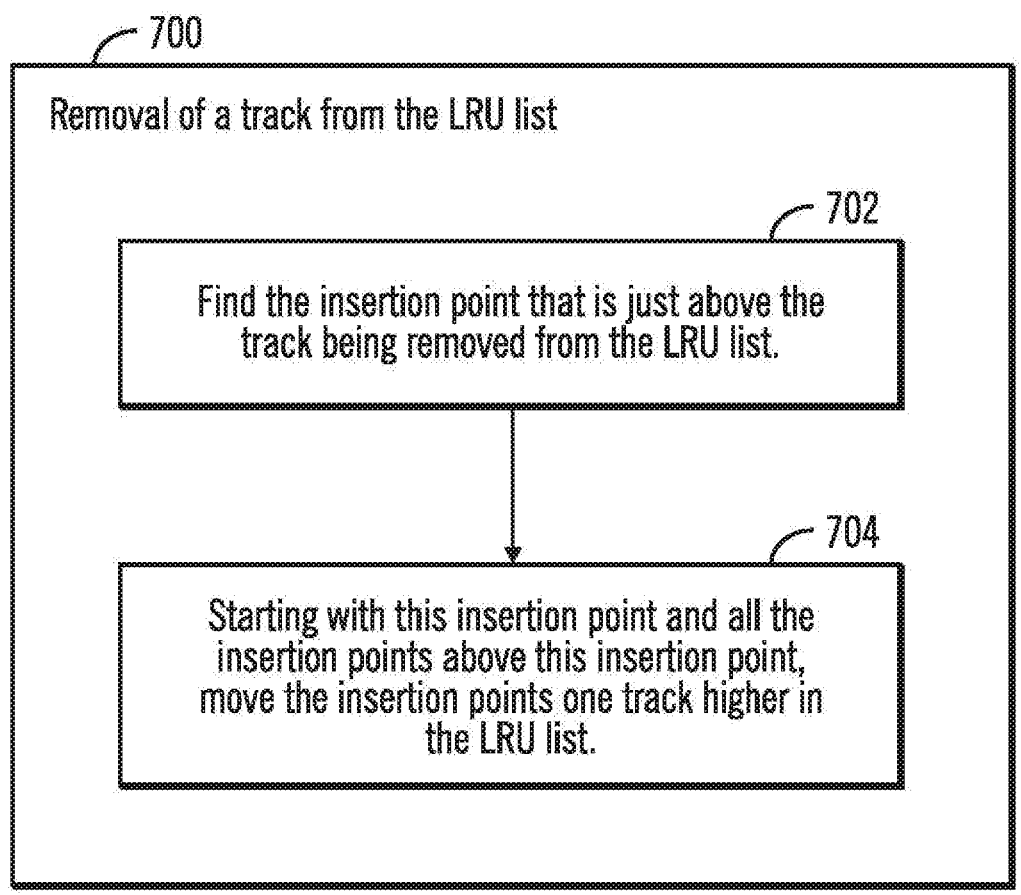
FIG. 7 illustrates a flowchart that shows the removal of a track to a LRU list, in accordance with certain embodiments.

FIG. 7 illustrates a flowchart 700 that shows the removal of a track to a LRU list 118 comprising either an LRU list for the DRAM cache 112 or a LRU list for the SCM cache 114, in accordance with certain embodiments. The operations shown in FIG. 7 may be performed by the cache management application 116 that executes in the storage controller 102.

Control starts at block 702 in which the cache management application 116 finds the insertion point that is just above the track being removed from the LRU list 118. Every track has a timestamp in the LRU list. The timestamp may be compared with the insertion points to find the insertion point just above the track being removed. Starting with the insertion point and all the insertion points above the insertion point, the cache management application 116 moves the insertion points one track higher in the LRU list 118.

Therefore, FIG. 7 illustrates certain embodiments to remove tracks from the LRU list 118.

Figure 8:
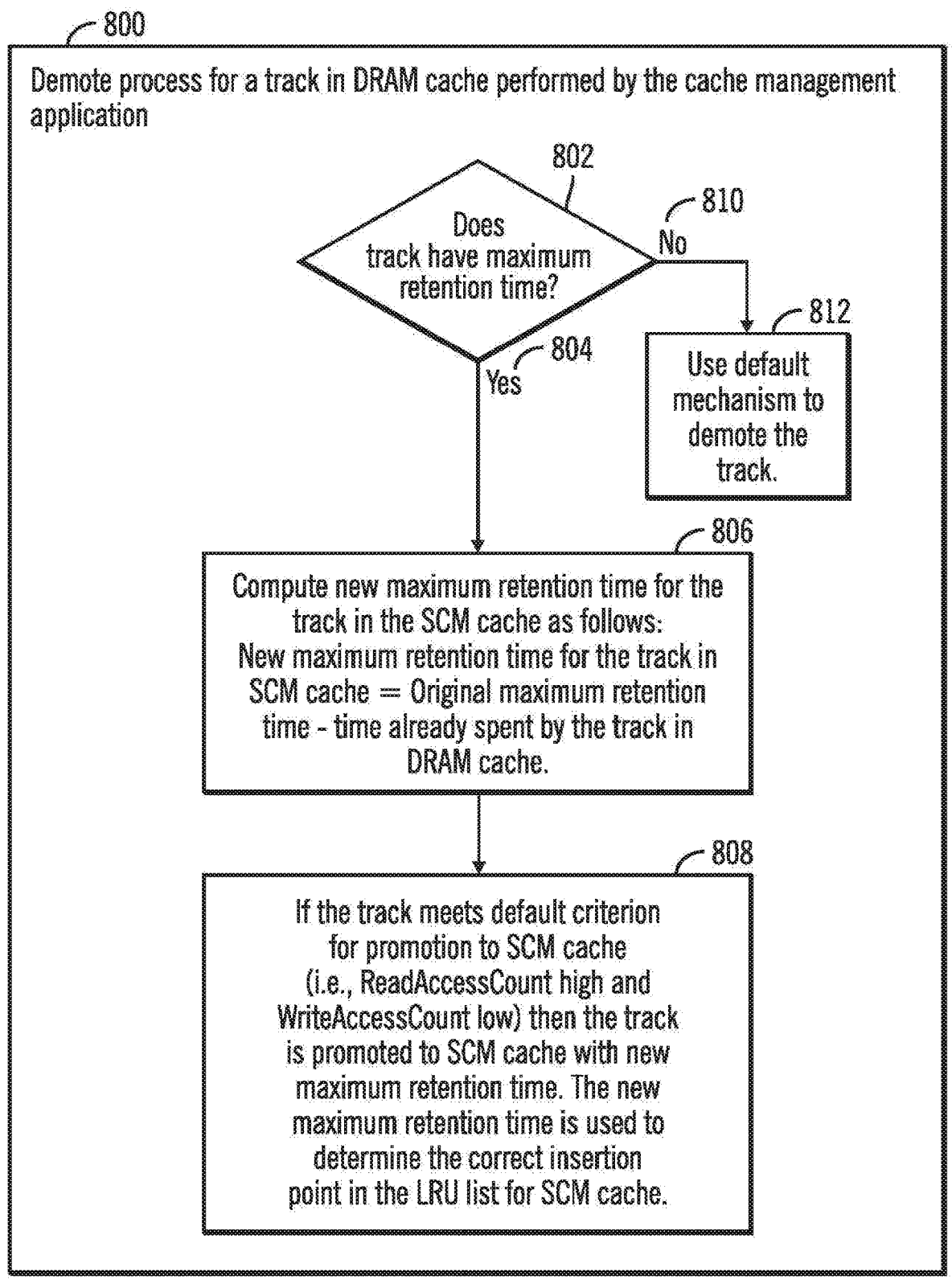
FIG. 8 illustrates a flowchart that shows the demote process for a track in the DRAM cache as performed by a cache management application, in accordance with certain embodiments.

FIG. 8 illustrates a flow chart 800 for a demote process for a track in the DRAM cache 112 performed by the cache management application 116 that executes in the storage controller 102, in accordance with certain embodiments. The demote process is for demoting a track from the DRAM cache 112 to the SCM cache 114.

Control starts at block 802 in which the cache management application 116 determines whether a track has a maximum retention time. If so ("Yes" branch 804) control proceeds to block 806 in which the cache management application 116 determines the maximum retention time for the track in the SCM cache 114 as follows: New maximum retention time for the track for the SCM cache=Original maximum retention time−time already spent by the track in the DRAM cache.

For example, if the host application 120 has indicated a 10 second maximum retention time for a track in the two-tier cache 104 and the track has already spent 3 seconds in the DRAM cache 112, then the maximum retention time for the track for the SCM cache 114 is 7 seconds (i.e., 10 seconds−3 sections) when the track is demoted from the DRAM cache 112 to the SCM cache 114.

From block 806 control proceeds to block 808 in which if the track meets default criterion for promotion to SCM cache 114 (i.e., ReadAccessCount high and WriteAccessCount low; this implies that a lot of read accesses and few write accesses of the track are taking place in the DRAM cache 112 where the high and low are predetermined thresholds) then the track is promoted to SCM cache 114 with the new maximum retention time (promotion to SCM cache from DRAM cache is equivalent to demotion from DRAM cache to SCM cache). The new maximum retention time is used to determine the correct insertion point in the LRU list for the SCM cache 114. If at block 802, the cache management application 116 determines that the track does not have a maximum retention time (block 810) then the default mechanism is used to demote the track (block 812).

Figure 9:
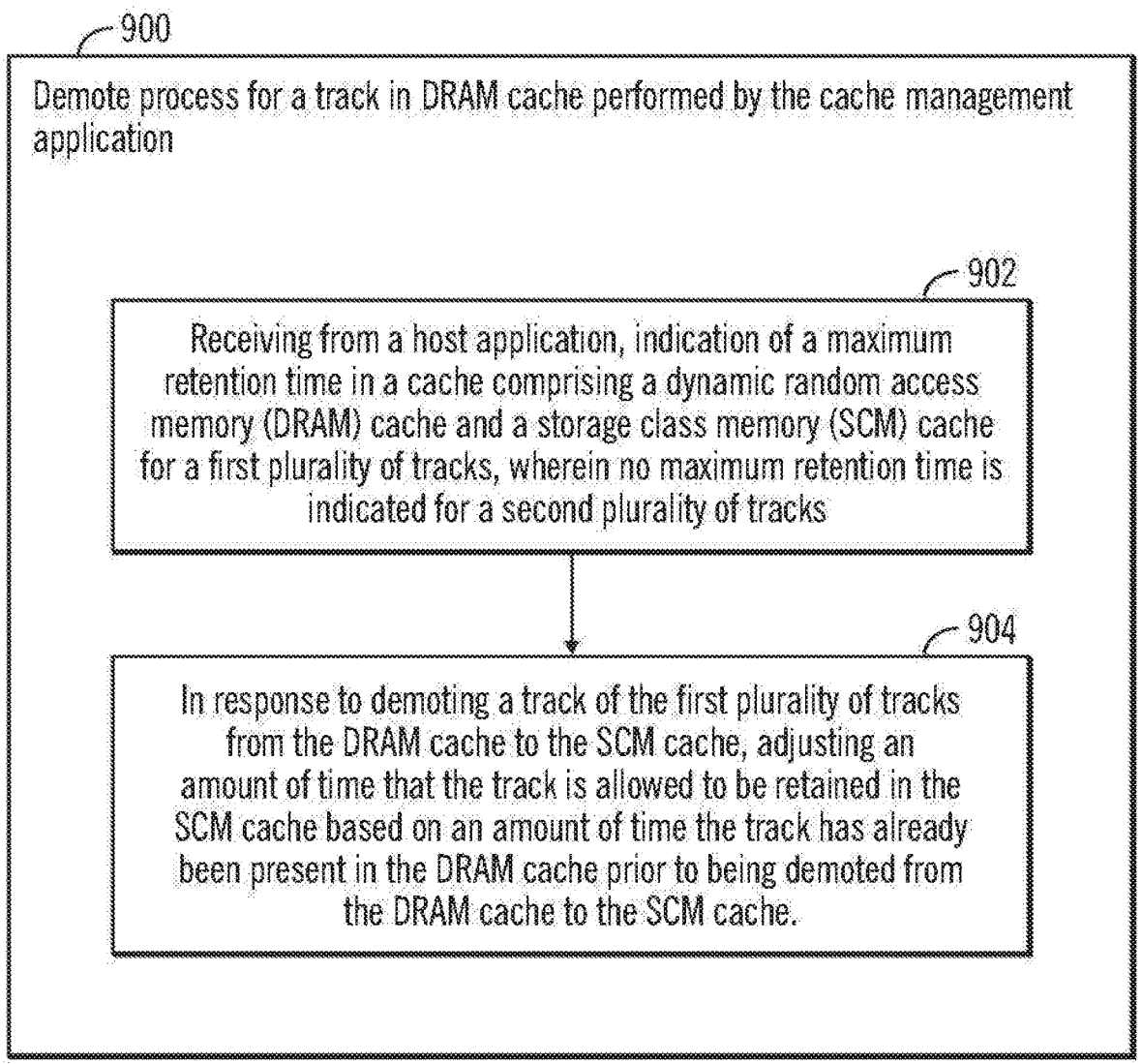
FIG. 9 illustrates a flowchart that shows operations for managing a two-tier cache, in accordance with certain embodiments.

FIG. 9 illustrates a flowchart 900 that shows operations for managing a two-tier cache, in accordance with certain embodiments. The operations shown in FIG. 9 may be performed by the cache management application 116 that executes in the storage controller 102.

Control starts at block 902 in which an indication of a maximum retention time in a cache 104 comprising a dynamic random access memory (DRAM) cache 112 and a storage class memory (SCM) cache 114 for a first plurality of tracks 121, 122 is received from a host application 120, wherein no maximum retention time is indicated for a second plurality of tracks 128, 130.

From block 902 control proceeds to block 904 in which in response to demoting a track of the first plurality of tracks 121 from the DRAM cache 112 to the SCM cache 114, an adjustment of an amount of time that the track is allowed to be retained in the SCM cache 114 is based on an amount of time the track has already been present in the DRAM cache 112 prior to being demoted from the DRAM cache 112 to the SCM cache 114. The amount of time that the track is allowed to be retained in the SCM cache may be determined by computing a difference between the maximum retention time indicated for the first plurality of tracks and the amount of time the track has already been present in the DRAM cache 112 prior to being demoted from the DRAM cache 112 to the SCM cache 114.

In yet further embodiments, an insertion point of the track in a least recently used (LRU) list of the SCM cache 114 for the track is determined based on the amount of time that the track is allowed to be retained in the SCM cache 114. In certain embodiments, different insertion points in the LRU list of the SCM cache 114 correspond to different amounts of time that a selected track of the first plurality of tracks is expected to be retained in the SCM cache 114, wherein the LRU lists with insertion points are configured to demote both tracks of the first plurality of tracks and the second plurality of tracks, and wherein different LRU lists are maintained or the DRAM cache 112 and the SCM cache 114 (as described in FIGS. 4 and 5). In further embodiments, in response to adding the track to the insertion point, insertion points in the LRU list of the SCM cache 114 are moved by one track to accommodate the adding of the track (as described in FIG. 7 of the Application).

Therefore FIGS. 1-9 illustrate certain embodiments for managing a two-tier cache with the higher tier being a DRAM cache and a lower tier being a SCM cache by integrating maximum retention times of tracks provided by a host application to a cache management application of a storage controller.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 10:
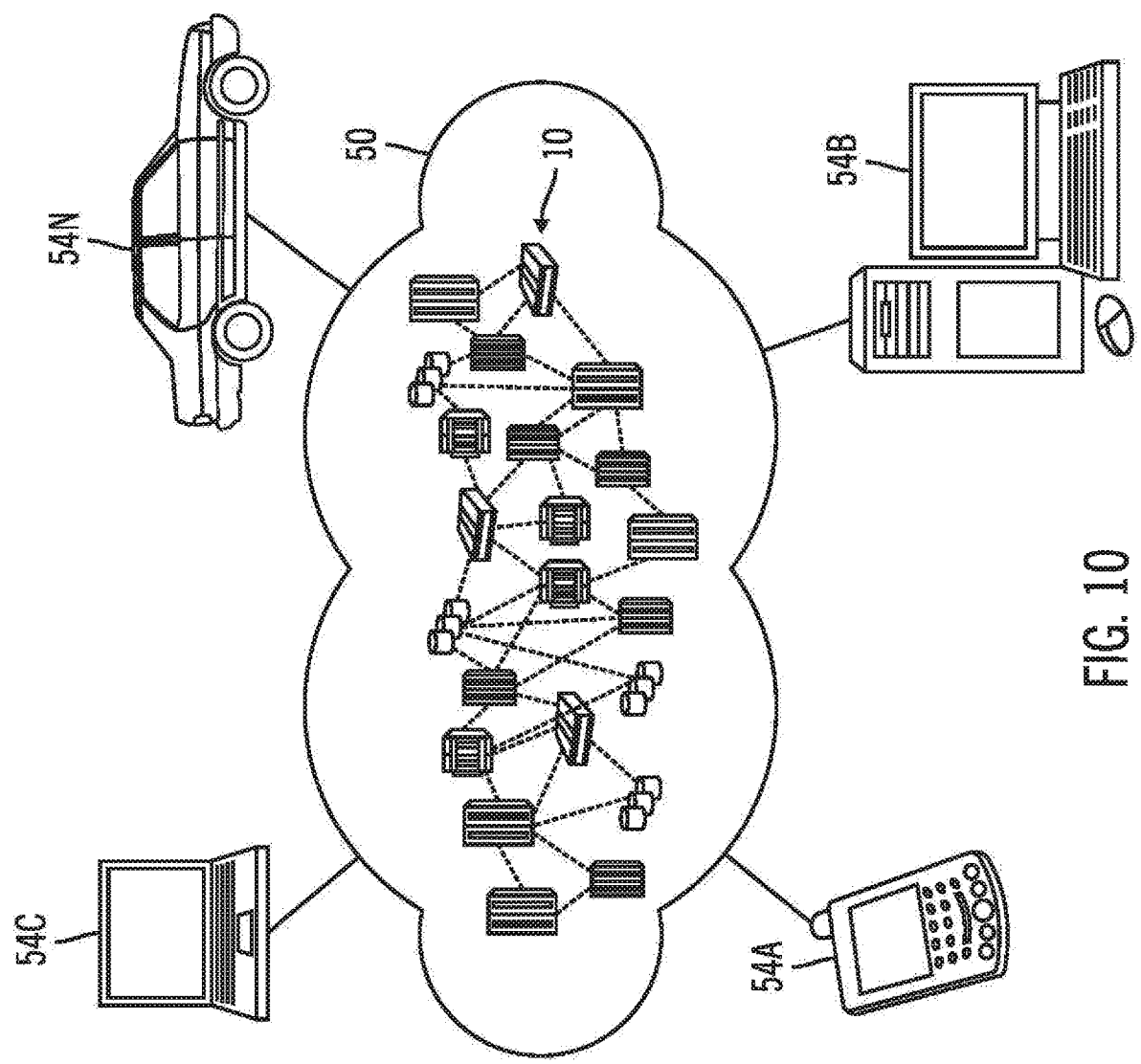
FIG. 10 illustrates a block diagram of a cloud computing environment, in accordance with certain embodiments.

Referring now to FIG. 10 an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
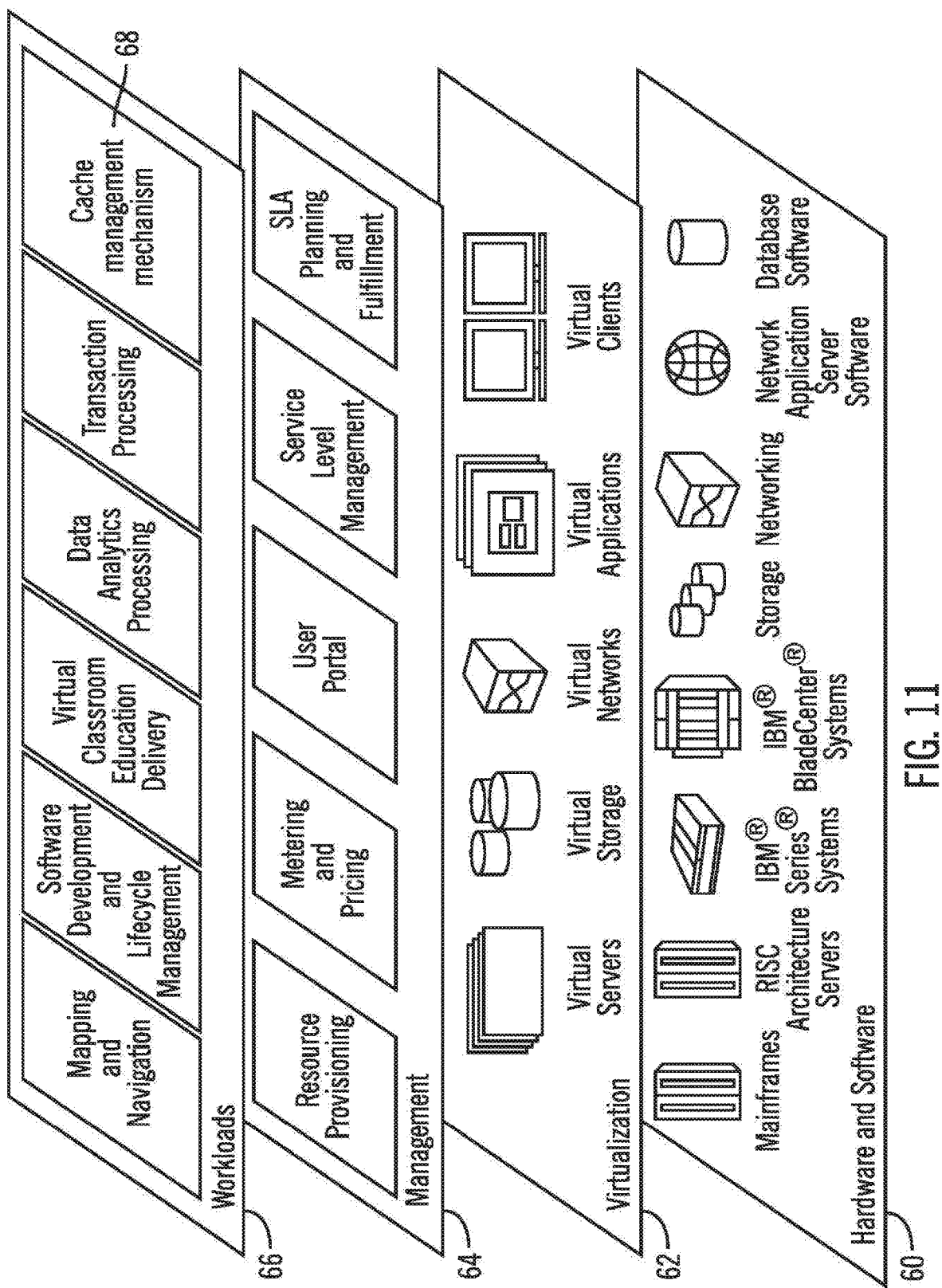
FIG. 11 illustrates a block diagram of further details of the cloud computing environment of FIG. 10, in accordance with certain embodiments.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

*IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and cache management mechanism 68 as shown in FIGS. 1-11.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the use's computer, partly on the use's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 12:
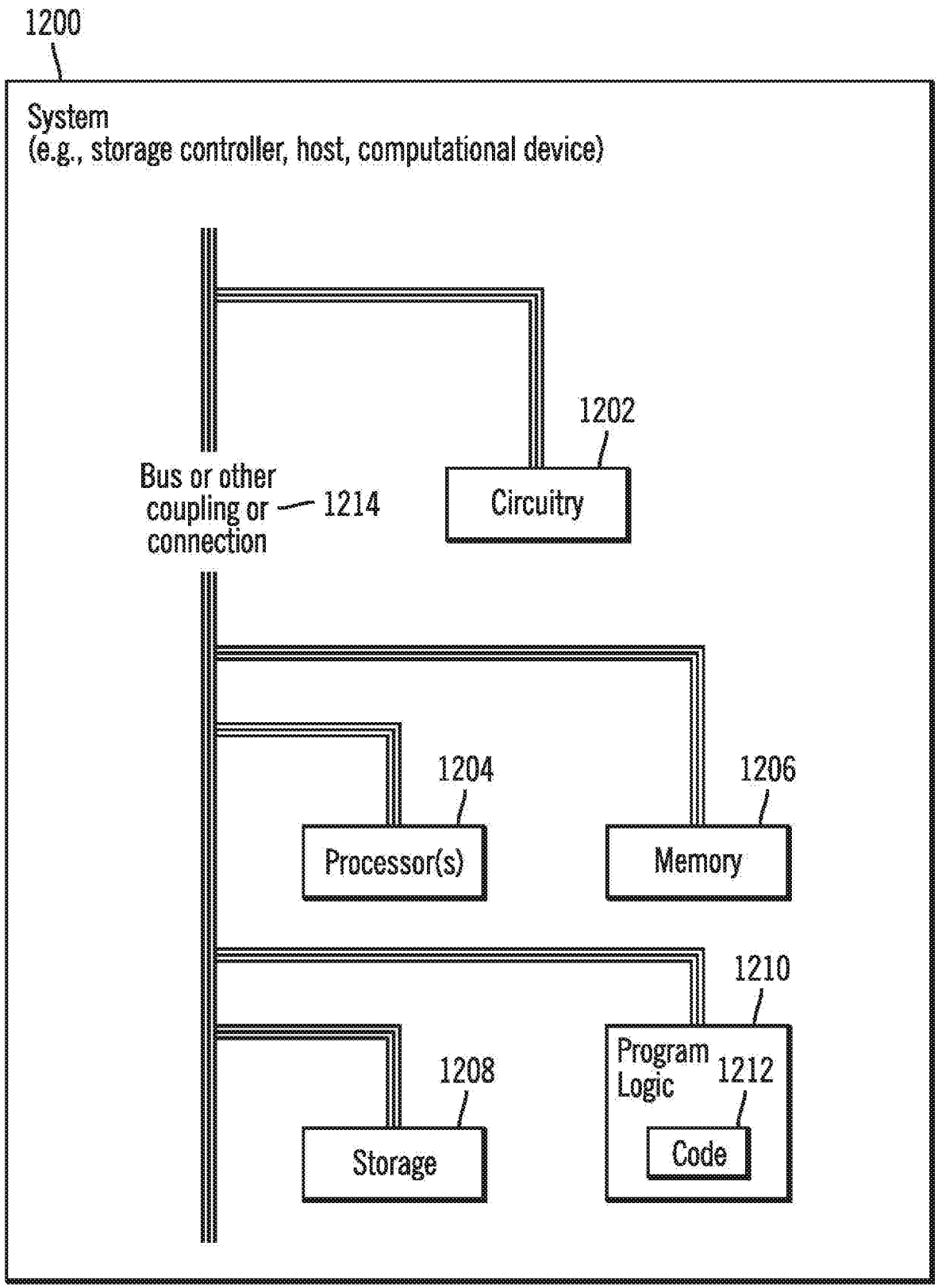
FIG. 12 illustrates a block diagram of a computational system that shows certain elements that may be included in the storage controller or the host, as described in FIGS. 1-12, in accordance with certain embodiments.

FIG. 12 illustrates a block diagram that shows certain elements that may be included in the storage controller 102 or the host 106, or other computational devices in accordance with certain embodiments. The system 1200 may include a circuitry 1202 that may in certain embodiments include at least a processor 1204. The system 1200 may also include a memory 1206 (e.g., a volatile memory device), and storage 1208. The storage 1208 may include a non-volatile memory device (e.g., EEPROM, ROM, PROM, flash, firmware, programmable logic, etc.), magnetic disk drive, optical disk drive, tape drive, etc. The storage 1208 may comprise an internal storage device, an attached storage device and/or a network accessible storage device. The system 1200 may include a program logic 1210 including code 1212 that may be loaded into the memory 1206 and executed by the processor 1204 or circuitry 1202. In certain embodiments, the program logic 1210 including code 1212 may be stored in the storage 1208. In certain other embodiments, the program logic 1210 may be implemented in the circuitry 1202. One or more of the components in the system 1200 may communicate via a bus or via other coupling or connection 1214. Therefore, while FIG. 12 shows the program logic 1210 separately from the other elements, the program logic 1210 may be implemented in the memory 1206 and/or the circuitry 1202.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or mom embodiments". "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   receiving from a host application, an indication of a maximum retention time in a cache comprising a first type of memory and a second type of memory for a first plurality of tracks, wherein no maximum retention time is indicated for a second plurality of tracks; and
   in response to demoting a track of the first plurality of tracks from the first type of memory to the second type of memory, adjusting a first amount of time that the track is allowed to be retained in the second type of memory based on a second amount of time that the track has already been present in the first type of memory prior to being demoted from the first type of memory to the second type of memory.

2. The method claim 1, wherein the first type of memory is a dynamic random access memory (DRAM) cache and the second type of memory is a storage class memory (SCM) cache, and wherein the first amount of time that the track is allowed to be retained in the SCM cache is determined by computing a difference between the maximum retention time indicated for the first plurality of tracks and the second amount of time the track has already been present in the DRAM cache prior to being demoted from the DRAM cache to the SCM cache.

3. The method of claim 2, wherein an insertion point of the track in a least recently used (LRU) list of the SCM cache for the track is determined based on the first amount of time that the track is allowed to be retained in the SCM cache.

4. The method of claim 3, wherein different insertion points in the LRU list of the SCM cache correspond to different amounts of time that a selected track of the first plurality of tracks is expected to be retained in the SCM cache, wherein the LRU lists with insertion points are configured to demote both tracks of the first plurality of tracks and the second plurality of tracks, and wherein different LRU lists are maintained or the DRAM cache and the SCM cache.

5. The method of claim 4, the method further comprising:
in response to adding the track to the insertion point, moving insertion points in the LRU list of the SCM cache by one track to accommodate the adding of the track.

6. The method of claim 1, wherein the first type of memory is a dynamic random access memory (DRAM) cache and the second type of memory is a storage class memory (SCM) cache, and wherein the DRAM cache has a lower latency and a lower storage capacity than the SCM cache, and wherein the DRAM cache and the SCM cache form a two-tier cache with the DRAM cache being a higher tier and the SCM cache being a lower tier, and wherein tracks are promoted to the SCM cache from the DRAM cache in response to determining that a read access time exceeds a first predetermined threshold and a write access time is below a second predetermined threshold.

7. The method of claim 6, wherein tracks of the second plurality of tracks undergo a default mechanism for demotion from the two-tier cache.

8. A system, comprising:
a memory; and
a processor coupled to the memory, wherein the processor performs operations, the operations performed by the processor comprising:
receiving from a host application, an indication of a maximum retention time in a cache comprising a first type of memory and a second type of memory for a first plurality of tracks, wherein no maximum retention time is indicated for a second plurality of tracks; and
in response to demoting a track of the first plurality of tracks from the first type of memory to the second type of memory, adjusting a first amount of time that the track is allowed to be retained in the second type of memory based on a second amount of time that the track has already been present in the first type of memory prior to being demoted from the first type of memory to the second type of memory.

9. The system claim 8, wherein the first type of memory is a dynamic random access memory (DRAM) cache and the second type of memory is a storage class memory (SCM) cache, and wherein the first amount of time that the track is allowed to be retained in the SCM cache is determined by computing a difference between the maximum retention time indicated for the first plurality of tracks and the second amount of time the track has already been present in the DRAM cache prior to being demoted from the DRAM cache to the SCM cache.

10. The system of claim 9, wherein an insertion point of the track in a least recently used (LRU) list of the SCM cache for the track is determined based on the first amount of time that the track is allowed to be retained in the SCM cache.

11. The system of claim 10, wherein different insertion points in the LRU list of the SCM cache correspond to different amounts of time that a selected track of the first plurality of tracks is expected to be retained in the SCM cache, wherein the LRU lists with insertion points are configured to demote both tracks of the first plurality of tracks and the second plurality of tracks, and wherein different LRU lists are maintained or the DRAM cache and the SCM cache.

12. The system of claim 11, the operations further comprising:
in response to adding the track to the insertion point, moving insertion points in the LRU list of the SCM cache by one track to accommodate the adding of the track.

13. The system of claim 8, wherein the first type of memory is a dynamic random access memory (DRAM) cache and the second type of memory is a storage class memory (SCM) cache, and wherein the DRAM cache has a lower latency and a lower storage capacity than the SCM cache, and wherein the DRAM cache and the SCM cache form a two-tier cache with the DRAM cache being a higher tier and the SCM cache being a lower tier, and wherein tracks are promoted to the SCM cache from the DRAM cache in response to determining that a read access time exceeds a first predetermined threshold and a write access time is below a second predetermined threshold.

14. The system of claim 13, wherein tracks of the second plurality of tracks undergo a default mechanism for demotion from the two-tier cache.

15. A computer program product, the computer program product comprising a computer readable storage medium having computer readable program code embodied therewith, the computer readable program code configured to perform operations, the operations comprising:
receiving from a host application, an indication of a maximum retention time in a cache comprising a first type of memory and a second type of memory for a first plurality of tracks, wherein no maximum retention time is indicated for a second plurality of tracks; and
in response to demoting a track of the first plurality of tracks from the first type of memory to the second type of memory, adjusting a first amount of time that the track is allowed to be retained in the second type of memory based on a second amount of time that the track has already been present in the first type of memory prior to being demoted from the first type of memory to the second type of memory.

16. The computer program product claim 15, wherein the first type of memory is a dynamic random access memory (DRAM) cache and the second type of memory is a storage class memory (SCM) cache, and wherein the first amount of time that the track is allowed to be retained in the SCM cache is determined by computing a difference between the maximum retention time indicated for the first plurality of tracks and the second amount of time the track has already been present in the DRAM cache prior to being demoted from the DRAM cache to the SCM cache.

17. The computer program product of claim 16, wherein an insertion point of the track in a least recently used (LRU) list of the SCM cache for the track is determined based on the first amount of time that the track is allowed to be retained in the SCM cache.

18. The computer program product of claim 17, wherein different insertion points in the LRU list of the SCM cache correspond to different amounts of time that a selected track of the first plurality of tracks is expected to be retained in the SCM cache, wherein the LRU lists with insertion points are configured to demote both tracks of the first plurality of tracks and the second plurality of tracks, and wherein different LRU lists are maintained or the DRAM cache and the SCM cache.

19. The computer program product of claim 18, the operations further comprising:

in response to adding the track to the insertion point, moving insertion points in the LRU list of the SCM cache by one track to accommodate the adding of the track.

20. The computer program product of claim 15, wherein the first type of memory is a dynamic random access memory (DRAM) cache and the second type of memory is a storage class memory (SCM) cache, and wherein the DRAM cache has a lower latency and a lower storage capacity than the SCM cache, and wherein the DRAM cache and the SCM cache form a two-tier cache with the DRAM cache being a higher tier and the SCM cache being a lower tier, and wherein tracks are promoted to the SCM cache from the DRAM cache in response to determining that a read access time exceeds a first predetermined threshold and a write access time is below a second predetermined threshold.

* * * * *